United States Patent [19]

Chang

[11] Patent Number: 4,925,821

[45] Date of Patent: * May 15, 1990

[54] METHOD FOR UTILIZING TRIETHYALUMINUM TO PREPARE AN ALUMOXANE SUPPORT FOR AN ACTIVE METALLOCENE CATALYST

[75] Inventor: Main Chang, Houston, Tex.

[73] Assignee: Exxon Chemical Patents Inc., Linden, N.J.

[ * ] Notice: The portion of the term of this patent subsequent to Mar. 27, 2007 has been disclaimed.

[21] Appl. No.: 268,834

[22] Filed: Nov. 8, 1988

Related U.S. Application Data

[63] Continuation-in-part of Ser. No. 134,413, Dec. 17, 1987.

[51] Int. Cl.$^5$ ............................................... C08F 4/64
[52] U.S. Cl. ................................... 502/107; 502/104; 502/111; 502/117; 502/120
[58] Field of Search ............... 502/104, 107, 111, 117, 502/120; 556/179

[56] References Cited

U.S. PATENT DOCUMENTS 4,808,561  2/1989  Welborn .......................... 502/120 X

FOREIGN PATENT DOCUMENTS 170059  5/1986  European Pat. Off. ............ 502/120

Primary Examiner—Patrick P. Garvin
Attorney, Agent, or Firm—M. B. Kurtzman

[57] ABSTRACT

This invention relates to a process for preparing a supported metallocene alumoxane catalyst for use in the polymerization of olefins. The invention particularly relates to the use of silica gel containing from about 6 to about 20 percent by weight adsorbed water as the catalyst support material. It has been found that such silica gel may be safely added to a solution, of trialkylaluminum to form by direct reaction with the adsorbed water content of the silica gel catalyst support material the majority of the alumoxane component requirement of the catalyst system. An alkylalumoxane coated silica gel is formed to which a trimethylaluminum treated metallocene may be added and the resulting material dried to free-flowing powder. The dry free flowing powder may then be used as a supported metallocene alumoxane catalyst complex for gas phase or liquid phase polymerization of olefins. The supported catalyst produced by such procedure has an activity at least comparable to a catalyst of similar composition which is produced exclusively with trimethylaluminum as the alumoxane forming aluminum alkyl.

19 Claims, No Drawings

METHOD FOR UTILIZING TRIETHYALUMINUM TO PREPARE AN ALUMOXANE SUPPORT FOR AN ACTIVE METALLOCENE CATALYST

This application is a continuation-in-part of copending application Ser. No. 134,413 filed December 17, 1987.

This invention relates to a process for preparing a supported metallocene-alumoxane catalyst for use in the gas phase or liquid phase polymerization of olefins. The invention particularly relates to the use of silica gel containing from about 6 to about 20 per cent by weight adsorbed water as the catalyst support material. It has been found that such silica gel may be safely added to a solution of trialkylaluminum to form, by direct reaction with the adsorbed water content of the silica gel catalyst support material, the alumoxane component of the catalyst system. In the present invention the alumoxane component is formed by contacting undehydrated silica gel with a solution of triethylaluminum after which the ethylalumoxane coated support is contacted with the product resulting from the reaction of a metallocene with trimethylaluminum. The resulting material is dryed to free flowing powder to yield a supported catalyst which is comparable in catalytic activity to a catalyst prepared solely with trimethylaluminum as the alumoxane forming component.

BACKGROUND OF THE INVENTION

Olefin polymerization catalysts comprising a metallocene and an aluminum alkyl component were first proposed in about 1956. Australian patent 220436 proposed for use as a polymerization catalyst a bis-(cyclopentadienyl) titanium, zirconium, or vanadium salt as reacted with a variety of halogenated or unhalogenated aluminum alkyl compounds. Although capable of catalyzing the polymerization of ethylene, such catalytic complexes, especially those made by reaction with a trialkyl aluminum, had an insufficient level of catalytic activity to be employed commercially for production of polyethylene or copolymers of ethylene.

Later it was found that certain metallocenes such as bis-(cyclopentadienyl) titanium, or zirconium dialkyls in combination with aluminum alkyl/water cocatalyst formed catalyst systems for the polymerization of ethylene. Such catalysts are discussed in German Patent Application 2,608,863 which discloses a polymerization catalyst for ethylene consisting of bis-(cyclopentadienyl) titanium dialkyl, trialkylaluminum and water. German Patent Application 2,608,933 discloses an ethylene polymerization catalyst consisting of a cyclopentadienyl zirconium salt, a trialkylaluminum cocatalyst and water. European Patent Application No. 0035242 discloses a process for preparing ethylene and atactic propylene polymers in the presence of a cyclopentadienyl transition metal salt and an alumoxane. Such catalysts have sufficient activity to be commercially useful and enable the control of polyolefin molecular weight by means other than hydrogen addition—such as by controlling the reaction temperature or by controlling the amount of cocatalyst alumoxane as such or as produced by the reaction of water with an aluminum alkyl.

To realize the benefits of such catalyst systems, one must use or produce the required alumoxane cocatalyst component. An alumoxane is produced by the reaction of an aluminum alkyl with water. The reaction of an aluminum alkyl with water is very rapid and highly exothermic. Because of the extreme violence of the reaction the alumoxane cocatalyst component has, heretofore, been separately prepared by one of two general methods. Alumoxanes may be prepared by adding an extremely finely divided water, such as in the form of a humid solvent, to a solution of aluminum alkyl in benzene or other aromatic hydrocarbons. The production of an alumoxane by such procedure requires use of explosion-proof equipment and very close control of the reaction conditions in order to reduce potential fire and explosion hazards. For this reason, it has been preferred to produce alumoxane by reacting an aluminum alkyl with a hydrated salt, such as hydrated copper sulfate. In such procedure a slurry of finely divided copper sulfate pentahydrate and toluene is formed and mantled under an inert gas. Aluminum alkyl is then slowly added to the slurry with stirring and the reaction mixture is maintained at room temperature for 24 to 48 hours during which a slow hydrolysis occurs by which alumoxane is produced. Although the production of alumoxane by a hydrated salt method significantly reduces the explosion and fire hazard inherent in the wet solvent production method, production of an alumoxane by reaction with a hydrated salt must be carried out as a process separate from that of producing the metallocene-alumoxane catalyst itself, is slow, and produces hazardous wastes that create disposal problems. Further, before the alumoxane can be used for the production of the an active catalyst complex the hydrated salt reagent must be separated from the alumoxane to prevent it from becoming entrained in the catalyst complex and thus contaminating any polymer produced therewith. In either of the above described methods, only trimethylaluminum (TMA) forms alumoxane with good catalytic activity, other alkylaluminums, such as triethylaluminum (TEAL), form alumoxane with very low catalytic activity.

U.S. Pat. No. 4,431,788 discloses a process for producing a starch filled polyolefin composition wherein a trialkyl aluminum is first reacted with starch particles of a mositure content below 6 weight percent. The starch particles are then treated with a (cyclopentadienyl)-chromium, titanium, vanadium or zirconium alkyl to form a metallocene-alumoxane catalyst complex on the surface of the starch particles. An olefin is then polymerized about the starch particles by solution or suspension polymerization procedures to form a free-flowing composition of polyolefin-coated starch particles. German Patent 3,240,382 likewise discloses a method for producing a filled polyolefin composition which utilizes the water content of an inorganic filler material to directly react with a trialkylaluminum and produce thereon an active metallocene-alumoxane catalyst complex. Polymer is produced by solution or gas phase procedures at the filler surface to uniformly coat the filler particles and provide a filled polymer composition.

German Patent 3,240,382 notes that the activity of a metallocene-alumoxane catalyst is greatly impaired or lost when prepared as a surface coating on an inorganic material. Although German Patent 3,240,382 suggests that an inorganic material containing absorbed or adsorbed water may be used as a filler material from which the alumoxane cocatalyst component may be prepared by direct reaction with a trialkylaluminum, the only water containing inorganic filler materials which are identified as capable of producing the alumoxane without adversely affecting the activity of the metallocene alumoxane catalyst complex are certain inorganic materials containing water of crystallization or bound water, such as gypsum or mica. German Patent 3,240,382 does not illustrate the production of a catalyst coated inorganic filler material wherein the inorganic material is one having absorbed or adsorbed water. Nor does German Patent 3,240,382 describe an inorganic filler material having absorbed or adsorbed water which has surface area or pore volume properties suitable for service as a catalyst support for a gas phase polymerization procedure.

My co-pending U.S. patent application Ser. No. 134,413 discloses a method by which the requisite alumoxane cocatalyst component for a supported metallocene gas phase polymerization catalyst may be safely and economically prepared by addition of an "undehydrated" silica gel to a trialkylaluminum solution. My co-pending application illustrates the production of highly active silica gel supported metallocene-alumoxane catalyst wherein trimethylaluminum is utilized to form the alumoxane. Although triethylaluminum is known to be ineffective for the separate production of an alumoxane cocatalyst to yield a highly active catalyst system with a metallocene, in accordance with the method disclosed in my co-pending application Ser. No. 134,413, triethylaluminum was found to be suitable for production of very active supported metallocene-alumoxane catalyst systems by directly reacting triethylaluminum with undehydrated silica.

Although the relatively low cost of triethylaluminum (TEAL) compared to trimethylaluminum (TMA) would seem to make TEAL preferred for use, such is still not the case when viewed in light of the difference in catalyst activity between a TMA produced catalyst system compared to a TEAL produced catalyst system. The supported catalyst produced exclusively with TMA always has an activity at least about 20% greater than a like catalyst system produced exclusively with TEAL. More typically, the activity of a TMA produced catalyst may be about 100% greater than a TEAL produced catalyst. Hence, from a commercial production standpoint, the catalyst activity difference still dictates the use of TMA for production of the alumoxane cocatalyst component dispite the cost savings that could be realized by use of TEAL as an alternative.

It would be desirable to devise an economical procedure whereby an active supported metallocene-alumoxane catalyst could be safely produced for use as a gas phase or liquid phase polymerization catalyst. To be economical the procedure should dispense with the requirement of producing the alumoxane component as a separate component apart from the procedure by which the catalyst itself is prepared. Further, it would be desirable to devise a procedure which utilizes TEAL to produce a substantial portion of the alumoxane cocatalyst required to provide a supported metallocene-alumoxane catalyst of an activity comparable to one wherein the requisite alumoxane cocatalyst component is formed exclusively from TMA.

SUMMARY OF THE INVENTION

The process of this invention utilizes as the catalyst support material silica particles having a surface area in the range of about 10 $m^2/g$ to about 700 $m^2/g$, preferably about 100-500 $m^2/g$ and desirably about 200-400 $m^2/g$, a pore volume of about 3 to about 0.5 cc/g and preferably 2-1 cc/g and an adsorbed water content of from about 6 to about 20 weight percent, preferably from about 7 to about 15 weight percent. Such silica particles are referred to hereafter as an "undehydrate silica gel." The silica gel supported metallocene-alumoxane catalyst is prepared by adding the undehydrated silica gel to a stirred solution of trialkylaluminum in an amount sufficient to provide a mole ratio of trialkylaluminum to water of from about 3:1 to about 1:2, preferably 1.2:1 to about 0.8:1; thereafter adding to this stirred solution a metallocene in an amount sufficient to provide an aluminum to transitional metal ratio of from about 1000:1 to 1:1, preferably from about 300:1 to 10:1, most preferably from about 150:1 to about 30:1; removing the solvent and drying the solids to a free flowing powder. Drying can be obtained by modest heating or vacuum.

The dried free flowing powder comprises a metallocene-alumoxane catalyst complex adsorbed upon the surface of the silica gel support particles. The supported catalyst complex has an activity sufficient for commercial polymerization of olefins by conventional gas phase or liquid phase polymerization procedures.

The process of this invention further provides for the use of TEAL to produce a substantial portion of the alumoxane cocatalyst component required to produce a supported metallocene-alumoxane catalyst having a degree of catalytic activity which is comparable to a catalyst of like composition wherein the alumoxane cocatalyst component is produced exclusively with TMA. Accordingly, in this embodiment of the process, the undehydrated silica gel support material is added to a stirred solution of TEAL to form an ethylalumoxane coated silica gel. A metallocene is separately reacted in solution with TMA and the resulting metallocene-TMA product is admixed with the ethylalumoxane coated silica gel after which the solvent is removed and the solids dried to a free-flowing powder. Wherein the quantity of TEAL reacted with the undehydrated silica gel is in a mole ratio to the water content of the silica gel of from about 0.7:1 to about 1:1 a supported catalyst of high activity can be realized by reacting a quantity of TMA with the metallocene such that the mole ratio of TMA:metallocene is from about 0.1:1 to about 10:1, the total mole quantity of both trialkylaluminums being in a mole ratio to the water content of the support of from about 0.8:1 to about 1.2:1 in the final supported catalyst composition. The supported metallocene-alumoxane catalyst so resulting has a catalyst activity at least comparable to a supported catalyst of like metallocene composition and Al:transition metal ratio the alumoxane component of which is produced exclusively from TMA.

DETAILED DESCRIPTION OF THE PREFERRED EMBODIMENTS

The present invention is directed towards a method for preparing a supported catalyst system for use in the gas phase or high pressure single phase polymerization of olefins. The supported catalyst is particularly useful for the gas phase polymerization of ethylene to high molecular weight polyethylenes such as linear low density polyethylene (LLDPE) and high density polyethylene (HDPE). The polymers are intended for fabrication into articles by extrusion, injection molding, thermoforming, rotational molding, and the like. In particular, the polymers prepared with the catalyst complex and by the method of this invention are homopolymers of ethylene and copolymers of ethylene with higher alpha-olefins having from 3 to about 10 carbon atoms and preferably 4 to 8 carbon atoms. Illustrative of the higher alpha-olefins are butene-1, hexene-1, and octene-1.

In the process of the present invention, ethylene, either alone or together with alpha-olefins having three or more carbon atoms, is polymerized in the presence of a silica gel supported catalyst system comprising at least one metallocene and an alumoxane.

In accordance with this invention, one can also produce olefin copolymers, particularly copolymers of ethylene and higher alpha-olefins having from 3–18 carbon atoms.

The active catalyst complex prepared by the process of this invention comprises a metallocene and an alumoxane formed onto the surface of a silica gel support material. Alumoxanes are oligomeric aluminum compounds represented by the general formula (R—Al—O)$_y$ which is believed to be a cyclic compound and R(R—Al—O—)$_y$AlR$_2$, which is a linear compound. In the general formula, "R" is a $C_1$–$C_{10}$ alkyl group such as, for example, methyl, ethyl, propyl, butyl, and pentyl and "y" is an integer from 2 to about 30 and represents the degree of oligomerization of the alumoxane. In the preparation of alumoxanes from, for example, the reaction of trimethylalumium and water, a mixture of linear and cyclic compounds is obtained. Generally, an alumoxane having a higher degree of oligomerization will, for a given metallocene, produce a catalyst complex of higher activity than will an alumoxane having a lower degree of oligomerization. Hence, the procedure by which alumoxane is produced by direct reaction of a trialkylaluminum with an undehydrated silica gel should insure the conversion of the bulk quantity of the trialkylaluminum to an alumoxane having a high degree of oligomerization. In accordance with this invention the desired degree of oligomerization is obtained by the order of addition of reactants as described hereinafter.

The metallocene may be any of the organometallic coordination compounds obtained as a cyclopentadienyl derivative of a transition metal. Metallocenes which are useful for preparing an active catalytic complex according to the process of this invention are the mono, bi and tri cyclopentadienyl or substituted cyclopentadienyl metal compounds and most preferably, bi-cyclopentadienyl compounds. The metallocenes particularly useful in this invention are represented by the general formulas:

   I.

wherein Cp is a cyclopentadienyl ring, M is a Group 4b or 5b transition metal and preferably a Group 4b transition metal, R is a hydrocarbyl group or hydrocarboxy group having from 1 to 20 carbon atoms, X is a halogen, and "m" is a whole number from 1 to 3, "n" is a whole number form 0 to 3, and "q" is a whole number from 0 to 3;

   II.

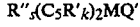   III.

wherein ($C_5R'_k$) is a cyclopentadienyl or substituted cyclopentadienyl, each R' is the same or different and is hydrogen or a hydrocarbyl radical such as alkyl, alkenyl, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4$–$C_6$ ring, R" is $C_1$–$C_4$ alkylene radical, a dialkyl germanium or silicone, or an alkyl phosphine or amine radical bridging two ($C_5R'_k$) rings, Q is a hydrocarbyl radical such as aryl, alkyl, alkenyl, alkylaryl, or arylalkyl having 1–20 carbon atoms, hydrocarboxy radical having 1–20 carbon atoms or halogen and can be the same or different, Q' is an alkylidene radical having from 1 to about 20 carbon atoms, "s" is 0 or 1, "g" is 0, 1 or 2; when "g" is 0, "s" is 0; "k" is 4 when "s" is 1 and "k" is 5 when "s" is 0 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals is methylidene, ethylidene and propylidene.

Of the metallocenes, hafnocene, zirconocenes and titanocenes are most preferred. Illustrative but non-limiting examples of the metallocenes which can be usefully employed in accordance with this invention are monocyclopentadienyl titanocenes such as, cyclopentadienyl titanium trichloride, pentamethylcyclopentadienyl titanium trichloride; bis(cyclopentadienyl) titanium diphenyl; the carbene represented by the formula Cp$_2$Ti=CH$_2$.Al(CH$_3$)$_2$Cl and derivatives of this reagent such as Cp$_2$Ti=CH$_2$.Al(CH$_3$)$_3$, (Cp$_2$TiCH$_2$)$_2$, Cp$_2$TiCH$_2$CH(CH$_3$)CH$_2$, Cp$_2$Ti=CHCH$_2$CH$_2$, Cp$_2$Ti=CH$_2$.AlR'''$_2$Cl, wherein Cp is a cyclopentadienyl or substituted cylopentadienyl radical and R''' is an alkyl, aryl, or alkylaryl radical having from 1–18 carbon atoms; substituted bis(Cp)Ti(IV) compounds such as bis(indenyl)Ti diphenyl or dichloride, bis(methylcyclopentadienyl)Ti diphenyl or dihalides and other dihalide complexes; dialkyl, trialkyl, tetra-alkyl and penta-alkyl cyclopentadienyl titanium compounds such as bis(1,2-dimethylcyclopentadienyl)Ti diphenyl or dichloride, bis(1,2-diethylcyclopentadienyl)Ti diphenyl or dichloride and other dihalide complexes; silicone, phosphine, amine or carbon bridged cyclopentadiene complexes, such as dimethyl silyldicyclopentadienyl titanium diphenyl or dichloride, methylenedicyclopentadienyl titanium diphenyl or dichloride and other dihalide complexes and the like.

Illustrative but non-limiting examples of the zirconocenes which can be usefully employed in accordance with this invention are, cyclopentadienyl zirconium trichloride, pentamethylcyclopentadienyl zirconium trichloride, bis(cyclopentadienyl)zirconium diphenyl, bis(cyclopentadienyl)zirconium dichloride, the alkyl substituted cyclopentadienes, such as bis(ethyl cyclopentadienyl)zirconium dimethyl, bis($\beta$-phenyl-propylcyclopentadienyl)zirconium dimethyl, bis(methylcyclopentadienyl)zirconium dimethyl, and dihalide complexes of the above; di-alkyl, tri-alkyl, tetra-alkyl, and penta-alkyl cyclopentadienes, such as bis(pentamethyl-cyclopentadienyl)zirconium dimethyl, bis(1,2-dimethyl-cyclopentadienyl)zirconium dimethyl, bis(1,3-diethyl-cyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae Cp$_2$Zr=CH$_2$P(C$_6$H$_5$)$_2$CH$_3$, and derivatives of these compounds such as $Cp_2ZrCH_2CH(CH_3)CH_2$.

Bis(cyclopentadienyl)hafnium dichloride, bis(cyclopentadienyl)hafnium dimethyl, bis(cyclopentadienyl)vanadium dichloride and the like are illustrative of other metallocenes.

Generally the use of a metallocene which comprises a bis(substituted cyclopentadienyl) zirconium will provide a catalyst complex of higher activity than a corresponding titanocene or a mono cyclopentadienyl metal compound. Hence bis(substituted cyclopentadienyl) zirconium compounds are preferred for use as the metallocene.

Heretofore the alumoxane component of the active catalyst complex has been separately prepared then added as such to a catalyst support material which is then treated with a metallocene to form the active catalyst complex. One procedure heretofore employed for preparing the alumoxane separately is that of contacting water in the form of a moist solvent with a solution of trialkyl aluminum in a suitable organic solvent such as benzene or aliphatic hydrocarbon. As before noted this procedure is attendant with fire and explosion hazards which requires the use of explosion-proof equipment and carefully controlled reaction conditions. In an alternative method heretofore employed for the separate production of alumoxane, an aluminum alkyl is contacted with a hydrated salt, such as hydrated copper sulfate. The method comprised treating a dilute solution of aluminum alkyl in, for example, toluene, with a copper sulfate pentahydrate. A slow, controlled hydrolysis of the aluminum alkyl to alumoxane results which substantially eliminats the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Also, only TMA based alumoxane has good catalytic activity. Other alkylaluminums, such as TEAL, based alumoxanes have very low catalytic activity. Correspondingly, the use of a separately produced alumoxane greatly increases the cost of producing a metallocene-alumoxane catalyst.

In accordance with the present invention the alumoxane component of the catalyst complex is prepared by direct reaction of a trialkylaluminum with the material utilized as the catalyst support, namely an undehydrated silica gel. Silica useful as the catalyst support is that which has a surface area in the range of about 10 to about 700 $m^2/g$, preferably about 100-500 and desirably about 200-400 $m^2/g$, a pore volume of about 3 to about 0.5 cc/g and preferably 2-1 cc/g, and an adsorbed water content of from about 6 to about 20 weight percent, preferably from about 7 to about 15 weight percent. The average particle size (APS) of the silica may be from about $0.3\mu$ to about $100\mu$, and for a gas phase catalyt preferably from about $30\mu$ to about $60\mu$ ($1\mu = 10^{-6}$m). For a catalyst intended for high pressure single pahse polymerization the particle size of the silica should preferably range from about 0.3 to no greater than about $10\mu$. Hereafter, silica having the above identified properties is referred to as undehydrated silica gel.

Undehydrate silica gel, as defined above, is added over time, about a few minutes, to a stirred solution of trialkylaluminum, in an amount sufficient to provide a mole ratio of trialkylaluminum to water of from about 3:1 to 1:2, preferably about 1.2:1 to 0.8:1. When used singularly the trialkylaluminum preferred for use in forming the alumoxane is trimethylaluminum. Next in order of preference, when used singularly, is triethylaluminum. Although triethylaluminum when reacted with a moist solvent or a hydrated salt does not produce an alumoxane product which will serve as a cocatalyst for production of a high activity metallocene-alumoxane supported catalyst, it may be used in accordance with the procedure of this invention to produce an alumoxane coated silica particle to which a metallocene may be added to form a high activity metallocene-alumoxane supported catalyst. Hence, in the process of this invention, a high activity supported catalyst may be produced exclusively from TEAL, although a TEAL produced catalyst will generally have a lower degree of catalytic activity than a catalyst of similar composition the alumoxane cocatalyst of which is produced exclusively from TMA. The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Also suitable for use as the trialkylaluminum are tripropylaluminuum, tri-n-butylaluminum triisobutylaluminum, tri(2-methylpentyl)aluminum, trihexylaluminum, tri-n-octylaluminum, and tri-n-decylaluminum. Although such trialkylaluminum compounds are ineffective when used to form an alumoxane cocatalyst separately from the silica gel support material, when reacted with an un-dehydrated silica gel in accordance with the procedure of the invention an effective alumoxane cocatalyst component is formed as a coating on the silica gel particle. Again, in comparison to an alumoxane produced from TMA, the alternative trialky aluminum compounds will not, when used singularly, produce a catalyst which is as active as one produced exclusively from TMA. The level of catalyst activity which can be attained with a given trialkylaluminum compound decreases as the size of the alkyl substituents increases.

Upon addition of the undehydrate silica gel to the solution of trialkylaluminum, the water content of the silica gel controllably reacts with the trialkylaluminum to produce an alumoxane which is deposited onto the surface of the silica gel particles. Although the reaction of the trialkylaluminum with the water content of the silica gel proceeds relatively quickly, that is, it is generally completed within the time of about 5 minutes, it does not occur with the explosive quickness of that which occurs with free water. The reaction may be safely conducted in conventional mixing equipment under a manel of inert gas.

A metallocene pre-reacted with trimethylaluminum (TMA), with a mole ratio of TMA:metallocene of from about 0.1:1 to about 10:1, is added to the stirred suspension of alumoxane silica gel product in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 30 minutes to about one hour at ambient or an elevated temperature of about 75° C. to permit the metallocene to undergo complete complexing reaction with the adsorbed alumoxane. Thereafter, the solvent is removed and the residual solids are dried to a free flowing powder. The free flowing powder comprises a silica gel supported metallocene-alumoxane catalyst complex of sufficiently high catalytic activity for use in the polymerization of olefins by conventional gas phase or high pressure single phase polymerization procedures.

The order of addition between the undehydrate silica gel and the trialkylaluminum is important with regards to the activity of the supported catalyst which results upon addition of the metallocene. A supported catalyst composition of little or no activity results wherein an trialkylaluminum is added to a stirred solvent suspension of undehydrated silica gel. It has been found that to prepare a supported catalyst composition of acceptable or high activity the order of mixing must be one wherein the undehydrated silica gel is added to a stirred solution of the trialkylaluminum. It is believed that this order of mixing forces the trialkylaluminum to undergo reaction in the context of a transient localized excess of trialkyl aluminum compared to a transient localized deficiency of water. Under a mixing condition which slowly adds undehydrated silica gel to a stirred solution of trialkyl aluminum, the bulk content of the trialkylaluminum converts to an alumoxane with a degree of oligomerization of about 2–30 ($y=2-30$). Production of an alumoxane with this degree of oligomerization results in a final metallocene alumoxane catalyst complex of useful or high activity. A reverse order of mixing, that is, addition of an trialkylaluminum to a stirred solvent suspension of undehydrated silica gel yields a catalyst which has a poor degree of catalytic activity.

In addition to the importance of proper mixing order in achieving a supported catalyst of useful activity, it has also been observed that the water content of the undehydrated silica gel influences final catalyst activity. Hence the undehydrated silica gel should have an adsorbed water content of from about 6 to about 20 weight percent. Preferably the adsorbed water content should be from about 7 to about 15 weight percent.

Further influencing the degree of activity attained in the final supported catalyst complex is the mole ratio of trialkylaluminum to the adsorbed water content of the undehydrated silica gel. The quantities of trialkyl aluminum employed should, in comparison to the quantity of undehydrated silica gel of specified adsorbed water content, be selected to provide a mole ratio of total trialkylaluminum to water of from about 3:1 to about 1:2, preferably from about 1.5:1 to about 0.8:1, more preferably from about 1.2:1 to about 0.8:1. It has been observed that for a given metallocene, a maximum catalyst activity is generally observed in the trialkylaluminum to water mole ratio range of about 1.2:1 to about 0.8:1. Depending upon the particular trialkylaluminum selected for use, commercially acceptable catalyst activities are exhibited in the trialkylaluminum to water mole ratio range of about 3:1 to about 1:2.

Also influencing the cost of production and the level of catalytic activity obtained in the final supported catalyst complex is the mole ratio of aluminum to transition metal of the metallocene component. The quantity of metallocene added to the alumoxane adsorbed silica gel solids should be selected to provide an aluminum to transition metal mole ratio of from about 1000:1 to about 1:1, preferably from about 300:1 to about 10:1, and most preferably from about 150:1 to about 30:1. From the standpoint of economic considerations it is desirable to operate in the lower ranges of the aluminum to transition metal mole ratio in order to minimize the cost of catalyst production. The procedure of this invention is one which provides the maximum conversion of the trialkylaluminum component to the most efficacious form of alumoxane, hence permits the safe production of a supported metallocene alumoxane catalyst of useful activity with minimum quantities of the costly trialkyl aluminum component.

As before noted, the type of trialkylaluminum utilized for production of the alumoxane cocatalyst component exerts an influence over the degree of catalytic activity that can be achieved in the final catalyst composition. Heretofore trimethylaluminum has been the trialkylaluminum of preference since it yields methylalumoxane (MAO). Metallocenes cocatalyzed with methylalumoxane exhibit substantially greater catalytic activities than when cocatalyzed with higher alkylalumoxanes such as ethylalumoxane. Thus, even though trimethylaluminum costs about ten times more than triethylaluminum, though desirable from a cost standpoint, because of its associated lower ability to activate the catalyst composition TEAL has not been the trialkyl aluminum of choice for use.

The present invention now provides a method by which the majority portion of the required alumoxane for a metallocene-alumoxane catalyst can be produced from triethylaluminum to produce a final supported catalyst having a degree of catalytic activity comparable to one of like Al:transition metal ratio and metallocene composition but which is cocatalyzed exclusively with methylalumoxane. In this embodiment of the invention, an ethylalumoxane coated silica gel is produced by treating an undehydrated silica gel with triethylaluminum. The ethylalumoxane coated silica gel is then treated with the product which results from the reaction of trimethylaluminum with a metallocene. Preferably the reaction of the undehydrated silica gel with triethylaluminum (TEAL) and the reaction of the metallocene with trimethylaluminum (TMA) are carried out in an inert solvent. Following addition of the TMA treated metallocene product to the TEAL treated silica gel, the solvent is removed and the solids dried to a free-flowing powder.

A catalyst composition the alumoxane cocatalyst of which is produced exclusively from TMA generally has a catalytic activity (measured as g polymer/g transition metal/hr) about twice as great as a catalyst of similar composition the cocatalyst alumoxane of which is produced exclusively from TEAL. In accordance with the method of this invention, a catalyst composition produced by addition of a TMA treated metallocene to a TEAL treated undehydrated silica gel will have an activity at least comparable to a catalyst of like metallocene composition and Al:transition metal ratio provided that the quantity of TEAL utilized is in a mole ratio to the water content of the undehydrated silica gel of from about 3:1 to about 1:2, preferably from about 1.2:1 to about 0.8:1, while the total mole sum of TEAL and TMA in mole ratio to the water content of the undehydrated silica gel is from about 3:1 to about 1:2, preferably from about 1.2:1 to about 0.8:1. Within such values the quantity of TEAL which may be employed constitutes on a mole basis over 99% of the alumoxane cocatalyst requirement. Hence on a mole basis the ratio of TMA to TEAL utilized in production of the final supported catalyst composition ranges from about 1:10,000, to about 1:1, and most preferably from about 1:1000 to about 1:10.

By appropriate selection of the relative amounts of the metallocene and the trialkylaluminum cocatalyst precursor, one can attain by the present method the particular active catalyst complex desired for any particular application. For example, higher concentrations of alumoxane in the catalyst system generally result in higher molecular weight polymer product. Therefore, when it is desired to produce a high molecular weight polymer a higher concentration of total trialkylaluminum is used, relative to the metallocene, than when it is desired to produce a lower molecular weight material. For most applications the ratio of aluminum in the aluminum alkyl to total metal in the metallocene can be in the range of from about 300:1 to about 20:1, and preferably about 200:1 to about 50:1.

Following the addition of the trimethylaluminum treated metallocene to the triethylaluminum treated silica gel solids, the catalyst is dried to a free flowing powder. Drying of the catalyst may be conducted by filtration or evaporation of solvent at a temperature up to about 85° C. The dried free flowing powder comprises a metallocene-alumoxane complex adsorbed upon the surface of the silica gel support particles. The dried state composition exhibits a level of catalytic activity useful for polymerization of olefins by a gas phase or liquid phase procedure as are known in the art.

As disclosed in copending application Ser. No. 728,111 filed April 29, 1985, the molecular weight of the polymer product can also be controlled by the judicious selection of substituents on the cyclopentadienyl ring and use of ligands for the metallocene. Further, the comonomer content can be controlled by the judicious selection of the metallocene. Hence, by the selection of catalyst components it is possible to tailor the polymer product with respect to molecular weight and density. Further, one may tailor the polymerization reaction conditions over a wide range of conditions for the production of polymers having particular properties.

In the examples following, the melt index (MI) and melt index ratio (MIR) were determined in accordance with ASTM test D1238.

EXAMPLE 1

A 300 ml quantity of dried and degassed heptane was charged into a one-liter three-neck flask equipped with a magnetic stirring bar. A mixture of 240 ml of trimethylaluminum (TMA) in heptane (1.62M) was then charged into the flask to form a clear solution.

A 100.0 g quantity of "undehydrated" silica gel (Davison 948) which contained 8.1% of water by weight was slowly added into the flask. After the addition was completed, the mixture was stirred at ambient temperature for one hour.

A 1.25 g quantity of di-(n-butylcyclopentadienyl) zirconium dichloride partially dissolved in 100 ml of heptane was mixed with 5.0 ml of TMA in heptane solution (1.62M). This mixture was allowed to react at ambient temperature for 30 minutes. The TMA-metallocene reaction mixture was then added into the flask and the mixture was allowed to react at ambient temperature for 30 minutes.

The mixture in the flask was heated to 55° C. in an oil bath while a nitrogen gas was purged through the flask to remove the solvent. The heating and nitrogen purging were stopped when the mixture in the flask turned into a solid form. The mixture was then dried under vacuum to form a free-flowing powder.

EXAMPLE 2 (COMPARATIVE)

The procedure of Example 1 was then followed with the exception that 260 ml of triethylaluminum (TEAL) solution (1.54M) was added into the flask and the zirconocene was added into the flask without the prereaction with TMA.

EXAMPLE 3

The procedure of Example 1 was followed with the exception that 200 ml of TEAL (1.54M) was added into the flask.

EXAMPLE 4

The procedure of Example 1 was followed with the exception that 220 ml of TEAL (1.54M) was added into the flask.

EXAMPLE 5

The procedure of Example 1 was followed with the exception that 230 ml of TEAL (1.54M) was added into the flask.

EXAMPLE 6

The procedure of Example 1 was followed with the exception that 260 ml of TEAL (1.54M) was added into the flask.

EXAMPLE 7

The procedure of Example 1 was followed with the exception that 340 ml of triethylaluminum (TEAL) solution (1.54M) was added into the flask and an "undehydrated" silica gel which contained 11.0% of water was then added into the flask.

EXAMPLE 8

The procedure of Example 1 was followed with the exception that 190 ml TEAL solution (1.54M), 50 g silica gel containing 12.9% water, 1.25 g zirconium compound, and 2.5 ml TMA solution (1.62M) were used in the preparation.

Catalyst Test

The activity of the catalyst powders of Examples 1–8 were determined at ambient temperature and 5 psig ethylene pressure by the following procedure. A 150 milliliter vial was freshly cleaned, heated to 130° C. for 6 hours, cooled to room temperature and flushed with nitrogen for 10 minutes. The vial was provided with a magnetic stirring bar and 2.5 grams of catalyst composition was charged into the vial. At ambient temperature ethylene gas was fed into the vial and an ethylene pressure of 5 psig was maintained for one hour. Thereafter ethylene gas was vented from the vial and the polyethylene formed inside the vial was collected and weighed. The yield of polyethylene obtained with each catalyst composition is reported in Table I.

TABLE 1

CATALYST TEST RESULT

| Catalyst | Amount Polyethylene Formed, g |
|---|---|
| Example 1 | 2.5 |
| 2 (comparative) | 1.5 |
| 3 | 1.3 |
| 4 | 2.6 |
| 5 | 3.6 |
| 6 | 3.3 |

TABLE 1-continued
CATALYST TEST RESULT

| Catalyst | Amount Polyethylene Formed, g |
|---|---|
| 7 | 3.9 |
| 8 | 3.8 |

The invention has been described with reference to its preferred embodiments. From this description, a person of ordinary skill in the art may appreciate changes that could be made in the invention which do not depart from the scope and spirit of the invention as described above and claimed hereafter.

I claim:

1. A process for preparing a supported metallocene alumoxane catalyst for polymerization of olefins, comprising the steps of:
   (a) adding undehydrated silica gel to a stirred solution containing triethylaluminum in an amount sufficient to provide a mole ratio of triethylaluminum to water of from about 0.7:1 to 1:1 and allowing the mixture to react;
   (b) adding to the reacted mixture a solution of a metallocene to which trimethylaluminum has been added in an amount such that the mole sum of triethylaluminum and trimethylaluminum is in a mole ratio to the water content of the undehydrated silica gel of from about 3:1 to about 1:2;
   (c) removing the solvent;
   (d) drying the solids to a free flowing powder.

2. The process of claim 1, wherein said undehydrated silica gel has a water content of from about 6 to about 20 weight percent.

3. The process of claim 2, wherein the mole ratio of aluminum to transition metal in said metallocene is from about 1000:1 to about 1:1.

4. The process of claim 2, wherein said undehydrated silica gel has a water content of from about 6 to about 20 weight percent and the mole ratio of total trialkylaluminum to water is from about 1.2:1 to about 0.8:1.

5. The process of claim 4, wherein the mole ratio of aluminum to transition metal in said metallocene is from about 300:1 to about 10:1.

6. The process of claim 5, wherein the mole ratio of trimethylaluminum to triethylaluminum is from about 1:1000 to about 1:10.

7. The process of claim 6, wherein said undehydrated silica gel has a water content of from about 7.0 to about 15 weight percent.

8. The process of claim 7, wherein said undehydrated silica gel has a surface area of from about 200 to about 400 m²/g, a pore volume of from about 1 to about 2 cc/g and a particle size of from about 30μ to about 60μ.

9. The process of claim 8, wherein the mole ratio of aluminum to transition metal in said metallocene is from about 150:1 to about 30:1.

10. A process for preparing a supported metallocene alumoxane catalyst for polymerization of ethylene and alpha olefin monomers, comprising the steps of:
    (a) adding undehydrated silica gel to a stirred solution containing triethylaluminum in an amount sufficient to provide a mole ratio of triethylaluminum to water of from about 3:1 to about 1:2 and allowing the mixture to react;
    (b) adding to the reaction mixture a product which results from the reaction of trimethylaluminum with a metallocene of the formula: $(Cp)_m MR_n X_q$ wherein Cp is a cyclopentadienyl ring, M is a Group 4b or 5b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3; $(C_5R'_k)_g R''_s (C_5R'_k) MQ_{3-g}$, or $R''_s (C_5R'_k)_2 MQ'$ wherein $(C_5R'_k)$ is a cyclopentadienyl or substituted cyclopentadienyl, each R' is the same or different and is hydrogen or a hydrocarbyl radical containing from 1 to 20 carbon atoms, a silicon-containing hydrocarbyl radical, or a hydrocarbyl radical wherein two carbon atoms are joined together to form a $C_4$-$C_6$ ring, R'' is $C_1$-$C_4$ alkyene radical, a dialkyl germanium or silicone, or an alkyl phosphine or amine radical bridging two $(C_5R'_k)$ rings, Q is a hydrocarbyl radical having 1-20 carbon atoms, hydrocarboxy radical having 1-20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0 and M is as defined above, wherein the quantity of trimethylaluminum added to the metallocene is such that the mole ratio of trimethylaluminum to metallocene is from about 0.1:1 to about 10:1;
    (c) removing the solvent;
    (d) drying the solids to a free flowing powder.

11. The process of claim 10 wherein said metallocene is a zirconocene or titanocene.

12. The process of claim 11, wherein said zirconocene is selected from the group consisting of cyclopentadienyl zirconium trichloride; pentamethylcyclopentadienyl zirconium trichloride; bis(cyclopentadienyl)zirconium diphenyl; bis(cyclopentadienyl)zirconium dichloride; alkyl substituted cyclopentadienes, and their dihalide complexes; dialkyl, trialkyl, tetra-alkyl, and penta-alkyl cyclo-pentadienes, and their dihalide complexes; and silicone, phosphorus, and carbon bridged cyclopentadiene complexes.

13. The process of claim 11, wherein said titanocene is selected from the group consisting of monocyclopentadienyl titanocenes; bis(cyclopentadienyl) titanium diphenyl; carbenes represented by the formula $Cp_2Ti=CH_2 \cdot Al(CH_3)_2Cl$, wherein Cp is a cyclopentadienyl or substituted cyclopentadienyl radical; substituted bis(Cp)Ti(IV) compounds and their dihalide complexes; dialkyl, trialkyl, tetra-alkyl and penta-alkyl cyclopentadienyl titanium compounds and their dihalide complexes; and silicone, phosphine, amine or carbon bridged cyclopentadiene complexes, and their dihalide complexes.

14. The process of claim 11, herein said undehydrated silica gel has a water content of from about 6 to about 20 weight percent and the mole ratio of trialkyl aluminum to water is from about 3:1 to about 1:2.

15. The process of claim 14, wherein the mole ratio of aluminum to transition metal in said metallocene is from about 300:1 to about 10:1.

16. The process of claim 15, wherein the mole ratio of trimethylaluminum to triethylaluminum is from about 1:1000 to about 1:10.

17. The process of clalim 16, wherein said undehydrated silica gel has a water content of from about 6.0 to about 20 weight percent.

18. The process of claim 17, wherein said undehydrated silica gel has a surface area of from about 200 to about 400 m²/g, a pore volume of from about 1 to about 2 cc/g and a particle size of from about 30μ to about 60μ.

19. The process of claim 18, wherein the mole ratio of aluminum to transition metal in said metallocene is from about 150:1 to about 30:1.

* * * * *